United States Patent [19]

Pettito, Sr.

[11] Patent Number: 5,144,481
[45] Date of Patent: Sep. 1, 1992

[54] SUBMERGED METER READING APPARATUS

[76] Inventor: John J. Pettito, Sr., 203 Hedge St., Clarksburg, W. Va. 26301

[21] Appl. No.: 699,593

[22] Filed: May 14, 1991

[51] Int. Cl.$^5$ .............................................. G02B 27/02
[52] U.S. Cl. .................................... 359/440; 359/800; 359/895; 362/109
[58] Field of Search ............... 362/109, 102, 32; 359/798, 799, 800, 802, 803, 894, 895, 367

[56] References Cited

U.S. PATENT DOCUMENTS

| | | | |
|---|---|---|---|
| 895,355 | 8/1908 | Farr | 362/109 |
| 1,451,096 | 4/1923 | Hagen | 359/800 |
| 2,355,086 | 8/1944 | Lang | 358/99 |
| 2,632,801 | 3/1953 | Donaldson | 358/100 |
| 2,788,390 | 4/1957 | Sheldon | 358/98 |
| 2,932,294 | 4/1960 | Fourestier et al. | 358/98 |
| 2,968,208 | 1/1961 | Shaw | 359/799 |
| 3,227,874 | 1/1966 | Smith | 358/99 |
| 3,612,649 | 10/1971 | Pusey | 359/440 |
| 4,215,916 | 8/1980 | Bell | 359/894 |
| 4,331,975 | 5/1982 | Krawza et al. | 358/100 |
| 4,415,952 | 11/1983 | Hattori et al. | 362/32 |
| 4,423,436 | 12/1983 | Kimura | 358/98 |
| 4,515,437 | 5/1985 | Story | 359/440 |
| 4,602,846 | 7/1986 | Karnes | 359/440 |
| 4,669,822 | 6/1987 | Myers | 359/440 |
| 4,870,950 | 10/1989 | Kanbara et al. | 358/98 |

Primary Examiner—James C. Yeung
Attorney, Agent, or Firm—Laubscher, Presta & Laubscher

[57] ABSTRACT

A submerged meter reading apparatus for enabling a human user to visually read a meter submerged in water or the like, having an elongated tubular body member with a sidewall defining an interior chamber, an upper end constructed to allow a user to look into the interior chamber, a lower end sealed with a transparent cap for positioning adjacent a submerged meter to be read therewith, a magnifying lens positioned in the interior chamber of the body member for producing a magnified image of the meter, a light for illuminating the meter, and a meter cap opening device for enabling a user to open a cap on the meter to be read.

6 Claims, 1 Drawing Sheet

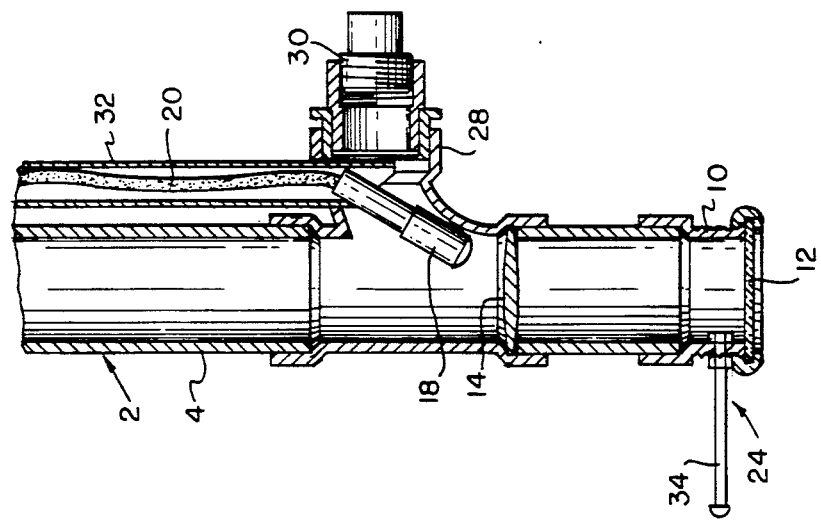
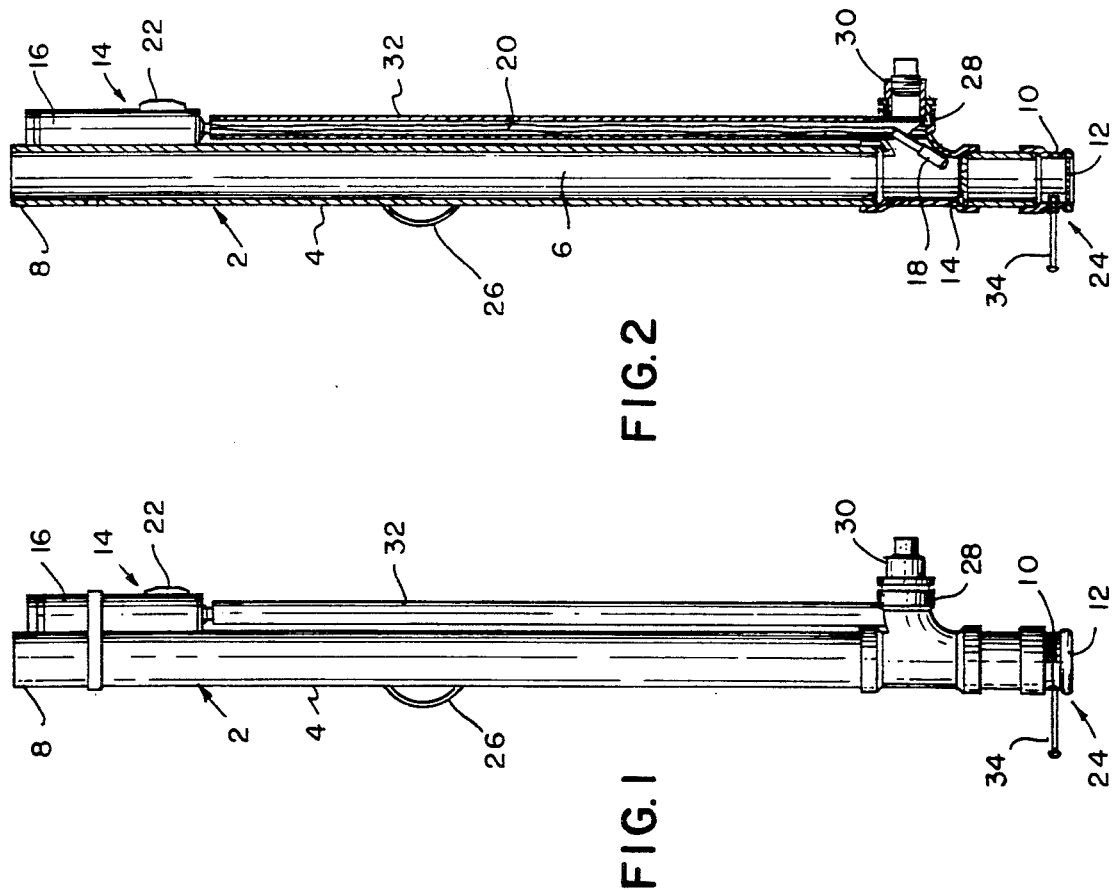

5,144,481

SUBMERGED METER READING APPARATUS

BACKGROUND OF THE INVENTION

The present invention relates to a viewing apparatus for enabling a human user to visually read a meter submerged in water or the like. In particular, the apparatus is designed for use in reading water meters used to monitor water consumption at particular locations.

Water meters are typically located in manholes at a depth of at least three feet to avoid freezing. The manholes which house the meter often become filled with water, thus making it difficult to read the meter. Therefore, a need has been created for an economical and efficient means for reading a meter which is submerged in water.

The present invention was developed to address this need by providing a viewing apparatus which enables a submerged meter to be quickly and easily read without having to remove any water.

BRIEF DESCRIPTION OF THE PRIOR ART

Presently, when a person wishes to read a water meter contained in a manhole that has become filled with water, the water must be bailed out of the manhole down to the level of the meter before the meter can be read. Bailing the water is often a very burdensome and time consuming task, and results in many wasted man hours for meter reading personnel.

SUMMARY OF THE INVENTION

Accordingly, it is a primary object of the present invention to provide an economical and efficient viewing apparatus for enabling a human user to visually read a meter submerged in water or the like, which comprises an elongated tubular body member having a side wall defining a hollow interior chamber, an upper end for viewing into the interior chamber, and a lower end sealed with a water-tight transparent cap, a magnifying lens positioned in the interior of the body member for producing a magnified image of the meter when viewed through the body member, light means for illuminating the meter, and meter cap opening means adjacent the lower end of the body member for enabling the user to open a cap on the meter to be read.

According to a more particular object of the invention, the body member sidewall is provided with an access portal for enabling access to the interior of the body member for cleaning the magnifying lens, and having a water-tight closure member for closing the portal when not in use.

Another object of the invention is to position the light source in the access portal, so that light is directed from above the magnifying lens downwardly through the magnifying lens and the transparent cap, thereby illuminating the meter to be read when the lower end of the body member is positioned adjacent the meter.

DESCRIPTION OF THE DRAWING

Other objects and advantages of the subject invention will become apparent from a study of the following specification when viewed in the light of the accompanying drawing, in which:

FIG. 1 is a side elevational view of the apparatus of the present invention;

FIG. 2 is a side elevational view like FIG. 1 with parts shown in section; and

FIG. 3 is an enlarged sectional side elevational view of the lower portion of the apparatus shown in FIG. 2.

DETAILED DESCRIPTION

Referring to FIGS. 1-3, there is shown the submerged meter viewing apparatus, comprising an elongated tubular body member 2 having a sidewall 4 defining a hollow interior chamber 6, an upper end 8 constructed to allow the user to view into the interior chamber 6, and a lower end 10 for positioning adjacent a submerged meter (not shown) to be read therewith. The body member 2 is preferably constructed of a light weight, water impervious, and durable material such as a suitable plastic material. A water-tight transparent cap 12 is secured to the lower end 10 of the body member 2, thereby enabling the body member 2 to be partially submerged in water without it entering the interior 6 of the body member. The upper end 8 of said body member 2 may be provided with a transparent cap or left open for directly viewing into the interior 6. The body member 2 should be of sufficient length to enable the lower end 10 to be placed adjacent a submerged meter to be read, while the upper end 8 remains un-submerged to allow a user to view into the upper end 8, and visually read the submerged meter. Therefore, for use with a typical water meter the body member 2 should be at least three feet in length.

A magnifying lens 14 is suitably positioned in the interior 6 of the body member 2 for producing a magnified image of the meter when viewed through the body member 2. Light means 14 is provided for illuminating the meter to be read. The light means 14 preferably includes a power supply 16, such as a battery, connected with the body member 2, a light source 18, such as a light bulb, positioned to illuminate the meter to be read, wiring means 20 operatively connecting the light source 18 with the power supply 16, and switch means 22 operatively connected with the wiring means 20 for selectively operating the light source 18 between on and off conditions.

A meter cap opening means 24 is secured to the lower end of the body member 2 for enabling a user to open a meter cap (not shown) on the meter by positioning the cap opening means 24 under the edge of the meter cap and pulling the cap (via the body member 2) upwardly until the cap flips to its open position, thereby exposing the readable part of the meter. Handle means 26 is secured to the body member 2 for carrying the apparatus, and for maneuvering the apparatus into the correct position during use.

An outwardly extending access portal 28 is provided in the sidewall 4 of the body member 2 for enabling access to the interior 6 of the body member 2 for cleaning the magnifying lens 14. A water-tight closure member 30 is provided for closing the access portal 28 when not in use. Preferably, the access portal 28 is positioned just above the location of the magnifying lens 14.

The power supply 16 is connected on the outside of the body member 2 at a position above the access portal 28, and the wiring means 20 extends from the power source 16 through the sidewall of the access portal 28 for connecting with the light source 18, which is preferably positioned in the access portal and operable to direct light from above the magnifying lens 14 downwardly through the magnifying lens 14 and the transparent cap 12 to illuminate the meter to be read. A water-tight conduit member 32 extends from the power supply 16 to the access portal 28 for housing the wiring means 20, and for protecting the wiring means 20 when the apparatus is submerged. By providing the power supply 16 and the wiring means 20 on the outside of the body number 2, and positioning the light source 18 in the access portal, the interior chamber 6 of the body member 2 is kept clear of obstruction for viewing therethrough. In addition, the access portal 28 may be used for maintenance of the light source 18.

The cap opening means 24 preferably is provided as an elongated bolt-type member 34 rigidly connected with and extending laterally outwardly from the sidewall 4 of the body member 2. It is noted that any type of rigid elongated member extending outwardly a suitable distance from the body member 2 would suffice.

The body member 2 may be provided as a sectional body member, as shown in the drawing, whereby the body member 2 can be disassembled into a plurality of sections for enabling the replacement and repair of selected parts of the viewing apparatus, such as the magnifying lens 14, the access portal 28 or the cap opening means 24. If a sectional body member were employed, the sections should form water-tight seals when assembled to keep water from entering the interior chamber 6 of the body member 2 when submerged.

While in accordance with the patent statute the preferred forms and embodiments of the invention have been illustrated and described, it will be apparent to those of ordinary skill in the art that various changes and modifications may be made without deviating from the inventive concepts set forth above.

What is claimed is:

1. A viewing apparatus for enabling a human user to visually read a meter submerged in water or the like, comprising:
   (a) an elongated tubular body member having a side wall defining a hollow interior chamber, an upper end constructed to allow the user to look into said interior chamber, and a lower end for positioning adjacent a submerged meter to be read therewith;
   (b) a transparent cap secured to the lower end of said body member to enable said body member to be partially submerged in water without it entering the interior of said body member;
   (c) a magnifying lens positioned in the interior of said body member near said lower end thereof, to produce a magnified image of the meter when viewed through said body member;
   (d) light means mounted on said body member for illuminating the meter to be read including:
      (1) a power supply connected with said body member;
      (2) a light source;
      (3) wiring means operatively connecting said light source with said power supply; and
      (4) switch means operatively connected with said wiring means for selectively operating said light source between on and off conditions;
   (e) a laterally extending access portal in said sidewall of said body member near the lower end thereof and positioned above said magnifying lens to enable access to the interior of said body member for cleaning said magnifying lens and servicing said light source, and a water tight closure member for selectively closing said access portal;
   (f) and further wherein said power supply is connected with said body member above said access portal, and said light source is positioned in said access portal and operable to direct light into the interior of said body member from above said magnifying lens downwardly through said magnifying lens and said transparent cap, thereby illuminating the meter to be read when the lower end of said body member is positioned adjacent the meter, and further comprising a water proof conduit member for housing said wiring means extending externally of said body member from said power supply and intersecting said access portal.

2. Apparatus as defined in claim 1, further comprising meter cap opening means secured to said body member adjacent said lower end thereof, for enabling a user to open a cap on the meter to be read.

3. Apparatus as defined in claim 2, wherein said cap opening means is an elongated bolt-type member extending laterally outwardly from said body member.

4. Apparatus as defined in claim 1, further comprising handle means secured to a midportion of said body member.

5. Apparatus as defined in claim 1, wherein said body member is sectional, said sectional body member being separable into a plurality of sections, thereby enabling replacement and repair of selected parts of said viewing apparatus, and further wherein said sections form water-tight seals when assembled.

6. Apparatus as defined in claim 1, wherein said body member is at least three feet in length.

* * * * *